United States Patent [19]

Himsley

[11] E Patent Number: Re. 31,687

[45] Reissued Date of Patent: Sep. 25, 1984

[54] METHOD OF STRIPPING SOLID PARTICLES

[76] Inventor: Alexander Himsley, 250 Merton St., Toronto, Ontario, M4S 1B1

[21] Appl. No.: 354,064

[22] Filed: Mar. 2, 1982

Related U.S. Patent Documents

Reissue of:

[64] Patent No.: 4,018,677
Issued: Apr. 19, 1977
Appl. No.: 668,088
Filed: Mar. 18, 1976

[51] Int. Cl.[3] ..... B01J 47/10

[52] U.S. Cl. ..... 521/26; 210/676; 210/189

[58] Field of Search ..... 210/189, 675, 676, 673; 521/26

[56] References Cited

U.S. PATENT DOCUMENTS

| | | | |
|---|---|---|---|
| 2,564,717 | 8/1951 | Olsen | 210/676 |
| 2,708,519 | 5/1955 | Novak | 210/674 |
| 2,973,319 | 2/1961 | Porter | 210/675 |
| 3,056,743 | 10/1962 | Eichorn et al. | 210/675 |
| 3,208,934 | 2/1965 | Kingsbury | 210/676 |
| 3,394,079 | 7/1968 | Miller et al. | 210/675 |
| 3,455,819 | 7/1969 | Crits | 210/673 |
| 3,515,277 | 6/1970 | Kingsbury et al. | 210/673 |
| 3,627,705 | 10/1971 | Kingsbury | 210/675 |
| 3,674,685 | 7/1972 | Arden | 210/676 |
| 4,035,292 | 7/1977 | Himsley | 210/189 |

FOREIGN PATENT DOCUMENTS

| | | | |
|---|---|---|---|
| 2356793 | 5/1974 | Fed. Rep. of Germany | 210/675 |
| 881015 | 11/1961 | United Kingdom | 210/675 |
| 904184 | 8/1962 | United Kingdom | 210/676 |
| 904185 | 8/1962 | United Kingdom | 210/676 |
| 1185495 | 3/1970 | United Kingdom | 210/676 |

*Primary Examiner*—Benoit Castel
*Attorney, Agent, or Firm*—Ridout & Maybee

[57] ABSTRACT

Loaded solid resin particles obtained as an output slurry from a continuous fluid/solid contactor are stripped by counter-current elution in which discrete measured batches of the loaded resin are isolated, each batch is drained of its carrier liquid, and successive drained batches are then slurried intermittently into the bottom of an elution column using strong eluate from the elution column to slurry the resin into the bottom of the column.

10 Claims, 2 Drawing Figures

METHOD OF STRIPPING SOLID PARTICLES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a method for stripping or eluting material from loaded solid particles. Typically, the loaded particles to which the stripping method is applied will be the loaded particles obtained as the output product from an absorber process wherein a fluid to be treated is contacted with solid particles, and the particles take up and become loaded with material initially present in the fluid. The invention provides a method whereby the material can be efficiently stripped from the particles.

An example of a fluid/solid particle contacting process, in conjunction with which the method of the present method may be employed, is described in U.S. patent application Ser. No. 399,515, filed Sept. 21, 1973 and now abandoned in favor of continuation-in-part application Ser. No. 576,872, filed May 12, 1975 to which reference should be made for further details.

2. Description of the Prior Art

Prior proposals of techniques for stripping material from solid particles of which the applicant is aware have suffered to a greater or lesser degree from disadvantages which detract from the efficiency of the stripping method.

As examples of prior stripping methods, there may be mentioned the methods described in Kingsbury U.S. Pat. No. 3,627,705, Arden U.S. Pat. No. 3,674,685 and the method described in applicant's above mentioned U.S. patent application. These describe stripping methods in which loaded resin particles are introduced into the bottom of a regeneration column and travel upwardly through the column. Eluant liquid is passed downwardly through the column counter-currently to the movement of the resin particles, and eluate, i.e., eluant containing the material eluted from the particles, is discharged from the lower region of the column. The applicant has observed that in these prior-described methods, variable quantities of liquid enter the regeneration column together with the input of the resin particles to the column, and that therefore the concentrations of the reactants in the column are unpredictable, so that the optimum concentrations for efficient stripping cannot readily be maintained. Further, in instances where the eluate comprises valuable metal ions or other valuable products, the eluate inevitably becomes diluted, so that recovery of the valuable material is made more difficult and more costly.

SUMMARY OF THE INVENTION

It is an object of the invention to avoid the above-noted and other shortcomings of the prior proposed methods.

Generally, in accordance with the invention, there is employed an elution column in which there is established a plurality of batches of solid particles arranged in vertically adjacent layers, the column holding an eluant liquid which contains progressively higher concentrations of eluted material toward the bottom of the column. A stripping eluant liquid is flowed downwardly through the column, and strong eluate is withdrawn from the bottom of the column. The loaded resin which is to be stripped is supplied as an input slurry in a carrier liquid, and prior to introducing the loaded particles into the column the carrier liquid is separated from the loaded particles which are thereafter introduced into the bottom of the column in the form of a slurry in the strong eluate liquid. Since the bottom of the column contains strong eluate at all times, there is no risk of the strong eluate in the column becoming contaminated or diluted with the carrier liquid. Further, this procedure avoids the problem of the denser strong eluate settling back into and mixing with the carrier liquid.

BRIEF DESCRIPTION OF THE DRAWINGS

Other advantages and objects of the present invention will become apparent from the following description of embodiments of the invention, with reference to the accompanying drawings, wherein.

DESCRIPTION OF THE PREFERRED EMBODIMENTS

Figure 1:
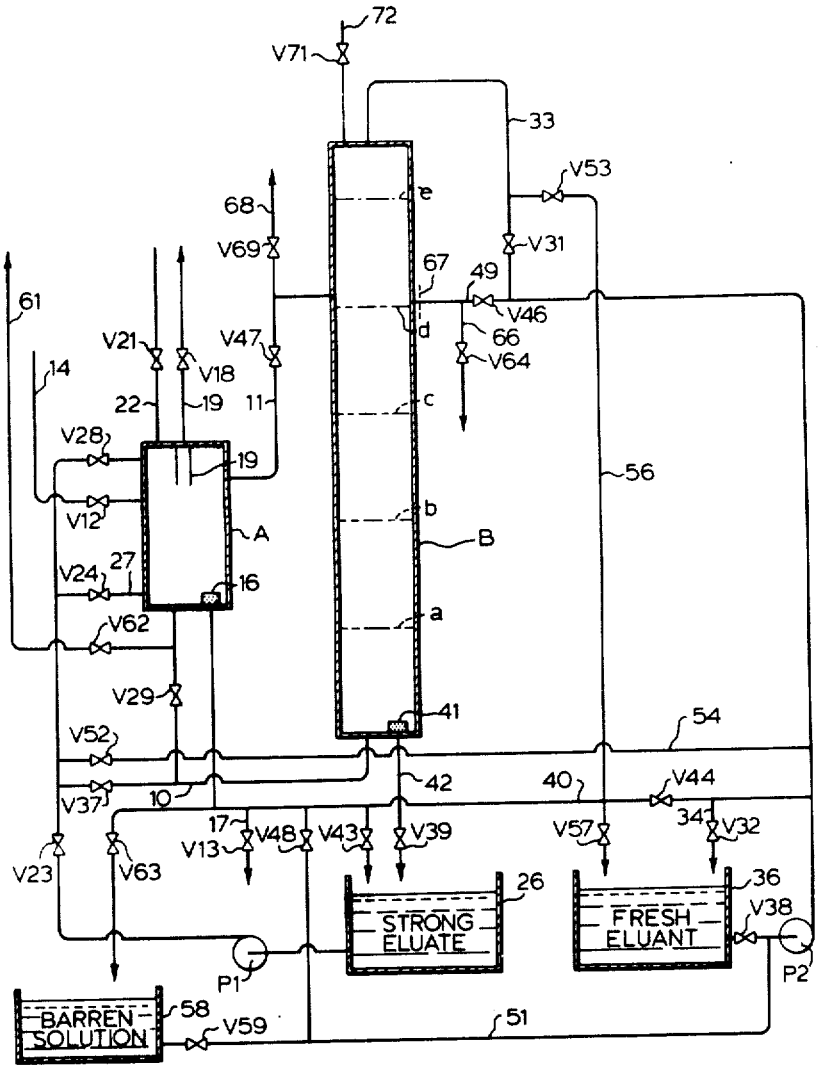
FIGS. 1 and 2 show in diagrammatic form first and second embodiments of elution apparatus, respectively, and like reference numerals and letters indicate like parts.

Referring to FIG. 1, this shows an elution apparatus which, in its main elements, comprises a measuring/-rinsing chamber A and an elution column B. The chamber and column are interconnected at the bottom through a lower or first conduit or line 10 through which loaded resin particles may be passed to the column from the chamber, and at the upper region by an upper or second conduit or line 11, extending from an upper level of the column to the upper part of the chamber, and through which partially stripped particles may be withdrawn from the upper part of the column and transferred to the chamber.

This apparatus may be employed for stripping material from the loaded particles which are obtained as the output from the absorption column of an adjoining feed liquor/solid particle contactor system, such as, for example, the absorption system described in applicant's above-mentioned United States patent application. The apparatus and method are, however, of general applicability to stripping material from any slurry of loaded solid particles.

The stripping method of the present invention proceeds as a cycle of operations carried out in successive stages. It is convenient to consider as a starting point the conditions prevailing prior to the input of a slurry of loaded particles to be stripped. At this point, the chamber A is empty of particles but full of liquid, e.g. the feed liquor to the absorption process from which the loaded particles are obtained, while the column B contains measured batches of particles in vertically adjacent layers indicated by the levels a to d in FIG. 1. The column B is full of eluant. The top of the column above the uppermost particle level d contains fresh eluant whilst the levels progressively below it contain increasing concentrations of the material eluted from the particles. At the bottom of the column there is strong eluate.

In operation, the input slurry of loaded particles is flowed firstly into the chamber A. The carrier liquid of this slurry may be, for example, the feed liquor employed in the absorption process in association with which the stripping method is used. The slurry is introduced by opening valves V12 and 13. Valve V12 is connected in an input line 14 at the side of chamber A, and the valve V13 is connected to a strainer 16 at the bottom of the chamber and a line 17 through which the feed liquor is discharged. The outflow of feed liquor through the line 17 may be recirculated to a supply chamber or other source of the input slurry to assist in transport of the particles to the chamber A. When all the particles have been removed from the source and particles no longer flow in through the line 14, valves V12 and 13 are closed, and the particles are allowed to settle in the chamber. Valve V12 is then opened and feed liquor is flowed into chamber A through the line 14. At the same time, a valve V18 is opened which is connected to a pipe 19 which extends within the upper part of chamber A. This results in flushing particles out of the chamber A through the pipe 19 until the level of the particles in the chamber falls to the level of the mouth of the pipe 19. This leaves a predetermined batch or measured quantity of the loaded particles remaining in the chamber A. The excess particles discharged from chamber A through the pipe 19 may be recirculated to the slurry source.

Valves V12 and 18 are closed and the valve V13 and valve V21 in an air inlet line 22 to the top of chamber A are opened to separate the carrier liquid from the loaded particles by draining the chamber A down through the strainer 16 and line 17, with air being drawn in through the line 22. If desired, a stream of warm air may be passed through the chamber A to discharge the feed liquor more rapidly and at least partially dry the particles.

When the chamber is essentially completely drained, valve V13 is shut, and chamber A is filled with strong eluate by running a pump $P_1$ with the valve V21 open, and also opening valves V23 and 24 which connect a strong eluate reservoir 26 to the lower part of chamber A through the pump $P_1$ and a line 27. Strong eluate is withdrawn from the strong eluate reservoir 26 and is passed through the line 27 into the chamber A, at such a rate as not to carry solid particles out through line 22, displacing air upwardly out of the chamber through the line 22.

When the chamber A is full of the eluate, as indicated by a level probe or sight glass in the chamber, or by other means, the valve V21 is closed and the measured batch of particles is slurried from Chamber A into the bottom of the elution column B through the lower line 10 by running the pump $P_1$ with the valves V23 and 24 open and also opening a valve V28 connecting the strong eluate input line 27 to the upper part of chamber A, a valve V29 connected in the lower line 10 from the bottom of chamber A, and valves V31 and 32 which connect the top of the column B to lines 33 and 34 leading to a fresh eluant reservoir 36. The extent to which the mass of particles in the chamber A is fluidized can be controlled by adjustment of the relative degrees of opening of the valves V24 and 28. The fluidized particle slurry passes from chamber A through the lower line 10 to the column B. The upflow of the eluate in the column brings the preceding batches of particles a to d into upward movement, and they shift upwardly as a plug. Fresh eluant is displaced from the top of column B through the lines 33 and 34 and is collected in the fresh eluant reservoir 36. When all the particles have left the chamber A as indicated by a sight glass in chamber A or in the line 10, the pump $P_1$ is stopped and the valves V23, 24, 28, 29, 31, and 32 are closed.

If required, for ease of operation, before transferring the particles from the chamber A to the column B, a flow of strong eluate may be introduced into the column B by running the pump $P_1$ with the valves V23, 31 and 32 open and also opening a valve V37 connecting the pump $P_1$ to the lower line 10, to induce lifting of the bed of particles in the column B for a few seconds prior to introducing particles into the column.

A volume of fresh eluant is then pumped into the top of column B by runing a pump $P_2$ connected to the eluant reservoir 36 with the valve V31 open, and opening a valve V38 between the reservoir 36 and pump $P_2$, and an eluate outlet valve V39 connected to a strainer 41 at the bottom of column B through a line 42. The fresh eluant withdrawn from the reservoir 36 is passed into the top of the column B through the line 33. This compacts the particles in the column B and displaces the strong eluate used for slurrying the particles from the bottom of the columns B through the strainer 41 and line 42 to the strong eluate reservoir 26. When the column of particles has been compacted as indicated by a rise in pressure in the line 33 through which the eluant enters, or any other convenient means, the pump $P_2$ is stopped and the valves V31, 38, and 39 are closed. The uppermost level of the bed of compacted particles in the column B will then be at an elevated position as indicated at e in FIG. 1.

Concurrently with the above-described step of compacting the particles, the chamber A is drained into the strong eluate reservoir 26 by gravity by opening a valve V43 connected to the strainer 16 and opening the valve V21, or by assistance with air pressure applied to line 22.

Valves V21 and 43 are closed, and fresh eluant is passed to the chamber A through a line 40 connected to the strainer 16, by running pump $P_2$ with the valves V21 and V38 and a valve V44 between the pump $P_2$ and the strainer 16 open, until the chamber A is filled with fresh eluant as indicated by a level probe or sight glass or other means.

Pump $P_2$ is then stopped and the valves V21, 38 and 44 are closed. The uppermost batch of particles in the column B extending from levels d to e is then flushed out of the top of the column B to the chamber A by slurrying it there with fresh eluant. This is performed by running the pump $P_2$ and opening the valve V31, a valve V46 connecting the pump $P_2$ to a line 49 entering the upper part of column B, a valve V47 in the upper line 11 between the column and chamber A, and a valve V48 connecting the strainer 16 to the pump $P_2$ through a line 51, so that fresh eluant is passed in a closed circuit into the upper part of the column through the lines 33 and 49 and is recirculated from the chamber A through the strainer 16 and the line 51 to the pump $P_2$. The degree of slurrying of the particles in the upper part of column B can be controlled by adjusting the extents of opening of the valves V31 and V46. The slurry of particles passes through the upper line 11 into the chamber A entrained in the eluant liquid.

When particles no longer flow through the line 11 as observed for example by a sight glass in the line 11, the pump $P_2$ is stopped, the valves V31, 46, 47, and 48 are closed, and a predetermined volume of fresh eluant, as measured by a meter or other means is pumped through chamber A and column B in series, causing a flow of strong eluate from the bottom of the column B. This is carried out by running the pump $P_2$ and opening the valve V28 to the upper side part of chamber A, the valve V38 between the eluant reservoir 36 and the pump $P_2$, the valve V39 connected to the strainer 41 at the bottom of column B, a valve V52 connecting the output of the pump $P_2$ to the valve V28 through a line 54, and a valve V53 connecting the strainer 16 of chamber A to the input line 33 at the top of column B through a line 56. Eluant from the reservoir 36 is passed through the line 54 and the valves V52 and V28 to the top of the chamber A, and the effluent from the strainer 16 at the bottom of the chamber A passes upwardly through the line 56 and the line 33 into the top of column B. The strong eluate displaced from the bottom of column B passes through the line 42 to the strong eluate reservoir 26 from where it may be passed to a recovery system for extraction of the desired material therefrom.

When the measured volume of eluant has passed through, pump $P_2$ is stopped and the valves V28, 38, 39, 52 and 53 are closed. Chamber A is then drained to the fresh eluant reservoir 36, either by gravity or with air pressure assistance, by opening the valve V21 and a valve V57 connected to the strainer 16 and the line 40 therefrom.

Valves V21 and 57 are closed and the chamber A is filled with a rinsing and carrier liquid, which will be used to transfer the stripped particles from chamber A to the absorption column or other system where they may be reused. In this example barren solution which is the effluent from the absorption column of the adjoining feed liquor/particle contactor system is used as the rinsing and carrier liquid. The barren solution is held in a reservoir 58. The barren solution is passed to the chamber A by opening a valve V59 connected between the reservoir 58 and the line 51 to the suction side of pump $P_2$, operating pump $P_2$, opening the valve V44 connected in the line 40 to the strainer 16 at the bottom of the chamber A, and opening the valve V21 allowing air to be displaced through the line 22 connected to the top of chamber A.

When chamber A is filled, as indicated by a level probe in chamber A or by other means, the valves V21 and 44 are closed, and the particles are slurried out of chamber A with barren solution through a slurry output line 61 connected to the bottom of the chamber A. This is achieved by running pump $P_2$ and opening a valve V62 in the outlet line 61, the valve V59 between $P_2$ and the reservoir 58, and the valves V52, 24 and 28 between the pump $P_2$ and chamber A.

When all of the particles have been transferred out of the chamber A as indicated for example by a sight glass in the output line 61, the pump $P_2$ is stopped and the valves V24, 28, 52, 59 and 62 are closed. The chamber A is then drained down into the barren solution reservoir by opening a valve V63 connected to the strainer 16 at the bottom of the chamber and opening the valve V21 at the top of the chamber to allow air to enter.

Chamber A can then be filled with feed liquor to the absorption column and the above-described cycle of operations can then be repeated.

It will be noted that in the method described, at no time does any appreciable amount of feed liquor or other carrier liquid of the input slurry enter the elution column B, so that an outflow of strong eluate free from dilution or contamination by the carrier liquid is obtained from the bottom of column B.

By the measuring procedure described above, a definite measured batch of the loaded particles is isolated in the chamber A and introduced into the column B in each cycle of operation. Even though the particles may change in volume as they travel up the elution column B and lose the material with which they were originally loaded, the position of the uppermost level e of the particles after each compaction step will remain substantially constant throughout successive cycles of operation, since substantially equal batches of loaded particles are introduced each time into the bottom of the column B and will raise the bed of particles in column B by equal amounts. Hence, substantially equal batches can be flushed out of the upper part of the column B when the eluant is flowed in through the lines 33 and 49 to the upper part of the column B and will be removed from the elution apparatus through the chamber A to the output line 61. Thus, the quantity of particles in the chamber A and the column B which is eluted in each cycle can be maintained approximately constant. *It will be appreciated that with the above-described process, the successive batches or layers of particles a to e are at all times maintained in a quiescent state in the column B, and the batches present in the column, and introduced successively into the column as the process proceeds through successive elution cycles, travel upwardly through the column in the form of discrete plugs of which the particles do not intermingle substantially with the particles of the vertically-adjacent plugs.* Provided that the concentration of material loaded on the particles remains reasonably uniform, equal amounts of eluant may be employed in each elution cycle in quantities determined empirically or by calculation to give satisfactory stripping. It will be appreciated that the apparatus and method therefore lends itself readily to automatic control under which the operation of the valves and the pumps is effected automatically by automatic timing and control apparatus.

The above-described apparatus has the further advantage that there is no need for distributor plates or grids that could interfere with the movement of resin particles into the chamber A or the column B or for maintaining the batches of particles in the required portions within the apparatus, and the apparatus is therefore free from projection of such plates or grids into the spaces occupied by the particles so that attrition of the particles is reduced or avoided. The strainers 16 and 41 are preferably fitted flush with the particle-retaining walls or the bottom and top surfaces of the apparatus for this reason.

In an alternative procedure employing the apparatus of FIG. 1, after a measured batch of particles has been isolated in chamber A and then slurried from chamber A to the bottom of the column B, a predetermined quantity of the barren solution instead of fresh eluant is used to compact the particles in the column B and to displace strong eluate from the column B. The barren solution is pumped in by running the pump $P_2$, and opening the valve V31 connected in the line 33 to the top of the column, the valve V59 connected to the barren solution reservoir 58 and the valve V39 connected to the strainer 41 at the bottom of column B.

The valve V39 is then closed and the uppermost batch of resin in the column B is then rinsed with barren solution by running the pump $P_2$ with the valves V31 and 59 open, and opening a valve V64 connected in a line 66 extending from the line 49 at the side of the upper part of the column B. A strainer 67 recessed in the side wall of the column B prevents loss of particles through the lines 49 and 66.

The rinsed batch of particles is then transferred out of the top of the column B direct to the absorption column through an outlet line 68 extending from the upper line 11. This is carried out by closing the valve V64 and running the pump $P_2$ with the valves V31, 46, and 59 open and opening a valve V69 in the outlet line 68.

When particles no longer flow out through the line 68, the pump $P_2$ is stopped and the valves V31, 46, 59 and 69 are closed. The liquid level in the column B is then lowered to just above the level of particles remaining in the column B by opening the valve V64 to drain off barren solution, a valve V71 in an air inlet line 72 connected to the top of the column B being opened, or the valves V53 and V57 being opened, to allow air to enter.

The valves V64 and V71 are closed, and a measured volume of fresh eluant is introduced above the bed of particles in the column B by running the pump $P_2$ with the valves V31 and V38 open and opening the valve V39 connected to the strainer 41 so that the strong eluate from the bottom of the column B is collected in the strong eluate reservoir 26, valve V39 being set to permit a lower outlet flow than is delivered by pump $P_2$. The valves V31, 38 and 39 are closed and the pump $P_2$ is stopped, and the apparatus is then ready to receive a further bath of input particles which are to be isolated as a measured batch in chamber A, drained, and transferred to the bottom of column B, so that the above cycle of operation can then be repeated.

Figure 2:
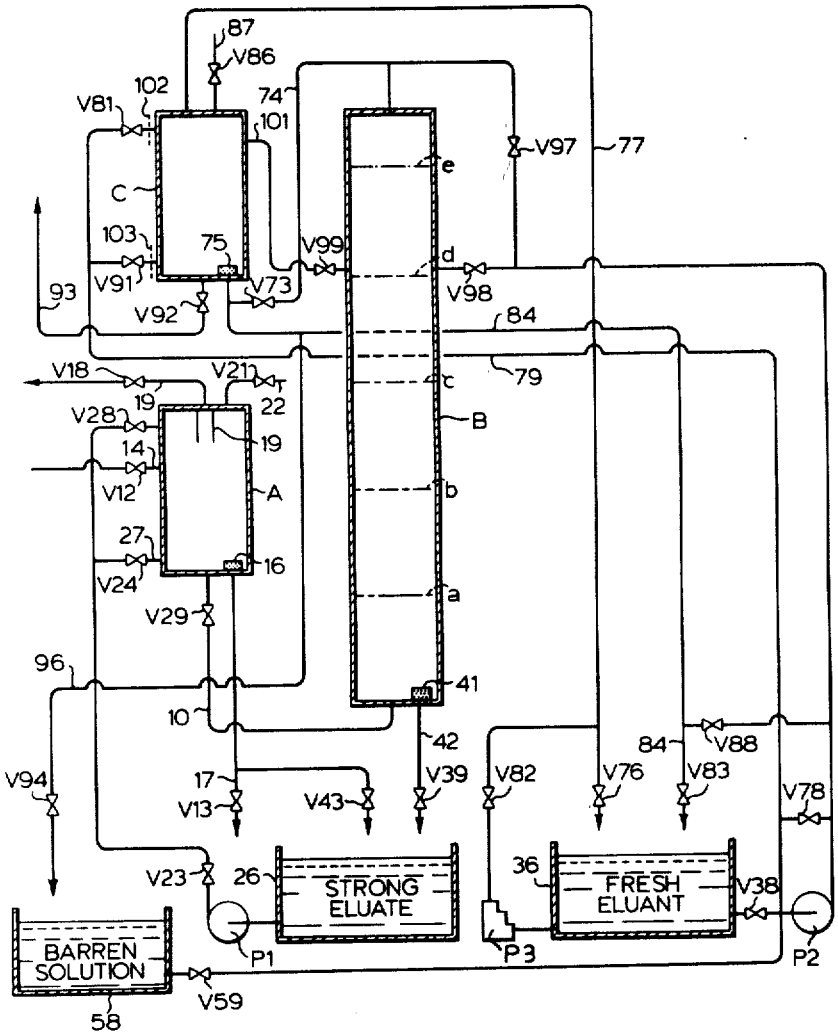

Referring to FIG. 2, the operation of the second embodiment of elution apparatus will now be described. The embodiment of FIG. 2 differs from that of FIG. 1 by having a separate rinsing chamber C, and the chamber A functions purely as a measuring chamber for the input of the loaded particles. Taking as the starting point the stage immediately prior to the introduction of an input slurry of loaded particles through the input line 14, at this stage the measuring chamber A is empty of particles but full of liquid e.g. feed liquor to the absorption process. The column B contains measured batches of resin up to the level d and is full of eluant with progressively increasing concentrations of the material eluted from the particles towards the bottom of the column. The rinsing chamber C is full of eluant, and contains a batch of almost completely eluted particles.

As with the procedure described above with reference to FIG. 1, an input slurry of particles is flowed into chamber A through line 14 and excess particles are removed through line 19 to leave a predetermined measured batch of the particles in chamber A. The batch of particles in chamber A is then drained of the carrier liquid through the line 17, and the chamber A is filled with strong eluate through the line 27.

When the chamber A is full of the eluate, the batch of particles is slurried from chamber A to the bottom of column B with strong eluate by running the pump $P_1$ and opening the valves V27 and 28 connected to the upper and lower parts of chamber A, the valve V29 in the lower line 10 between the bottom of chamber A and the bottom of column B, a valve V73 in a line 74 extending from the top of column B to a strainer 75 at the bottom of chamber C and a valve V76 in a line 77 from the top of chamber C to the fresh eluant reservoir 36, so that as the batch is transferred to the bottom of column B eluant is displaced from the top of column B through the chamber C to the eluant reservoir 36. The upflow of eluate in the column B lifts the bed of particles upwardly as a plug as the new batch of loaded particles enters the bottom of column B.

When all the particles have left chamber A, the valves V27, 28, 29, 73 and 76 are closed and the pump $P_1$ is stopped. A volume of fresh eluant is then pumped into the top of chamber C by running the pump $P_2$ and opening the valve V38 connected between $P_2$ and the eluant reservoir 36, the valve V39 connected in the line 42 from the strainer 41 at the bottom of column B, a valve V78 connecting the pump $P_2$ to a line 79, a valve V81 connecting the line 79 to the top of chamber C, and the valve V73 in the line 74 from the bottom of C to the top of B. This compacts the particles in chamber C and column B so that the particles in column B are packed down to a level indicated at e, and strong eluate is displaced from the bottom of column B to the strong eluate reservoir 26.

Concurrently with the compaction of the particles in chamber C and column B, chamber A is drained down into the strong eluate reservoir 26 by opening the air inlet line valve V21 at the top of chamber A and opening valve V43 connected to the strainer 16 at the bottom.

On compaction of the particles in column B there is an increase in pressure in chamber C and also in column B and this serves to actuate a pressure switch. The valves V38, 39, 73, 78 and 71 are closed, and the actuation of the pressure switch starts a volumetric pump $P_3$ running for a period of time controlled by a timer, and a valve V82 is opened connecting the pump $P_3$ to the line 77 to the top of chamber C, together with the valve V73 connecting the bottom of chamber C to the top of column B through the strainer 75 of chamber C, and the valve V39 in the line 42 from the strainer 41 at the bottom of column B. The flow of eluant through the rinsing chamber C and into the top of column B elutes the particles and strong eluate flows from the bottom of column B to the strong eluate reservoir 26 until the timer times out. Instead of using a timer and a volumetric pump, any other means could be used for passing a measured volume of eluant through chamber C and column B, e.g. a volume meter.

The pump $P_3$ then stops and the valves V39, 73 and 82 close. The rinsing chamber C is drained of fresh eluant by opening a valve V83 in a line 84 extending from the strainer 75 at the bottom of chamber C to the fresh eluant reservoir 36 and opening a valve V86 in an air inlet line 87 at the top of chamber C. When chamber C is completely drained, the valve V83 is closed and the chamber C is filled with barren solution by running the pump $P_2$ and opening the valve V59 between the barren solution reservoir 58 and the pump $P_2$, valve V86 on the air line 87 at the top of chamber C, and a valve V88 connecting the pump $P_2$ to the line 84 connected to the strainer 75.

When chamber C is filled, valves V86 and 88 are closed and the now completely eluted particles in chamber C are slurried to the absorption column by running the pump $P_2$ with the valve V59 between the barren solution reservoir 58 and pump $P_2$ open, and opening the valve V78 between the pump $P_2$ and the line 79 to the top of chamber C, the valve V81 in the line 79, a valve V91 from the line 79 to the lower part of chamber C, and a valve V92 in a slurry outlet line 93 extending from the bottom of chamber C.

When chamber C has been emptied of particles, the pump $P_2$ is stopped and the valves V59, 78, 81, 91 and 92 are closed. The chamber C is then emptied of barren solution by opening the valve V86 in the air line valve 87 and a valve V94 in a line 96 from the strainer 75, allowing the barren solutions to drain in the reservoir 58. When chamber C has been completely drained, the outlet valve V94 is closed, and chamber C is filled with fresh eluant by running the pump $P_2$ with the air outlet line valve V86 open, and opening the valve V38 between the pump $P_2$ and the eluant reservoir 36, and the valve V88 in the line 86 between the strainer 75 and the pump $P_2$.

The pump $P_2$ is then stopped and the valves V38, 86 and 88 are closed. The uppermost batch of particles in column B is then slurried from column B to chamber C with fresh eluant by running the pump $P_2$ and opening valves V97 and V98 connecting the pump $P_2$ to the top and the upper part of the column B, respectively, opening a valve V99 in a line 101 from the upper part of the side of column B to the upper part of chamber C and also opening valves V81 and 91 to recirculate eluant from the upper and lower parts of the side of the chamber C to the pump $P_2$ through the line 79. Strainers 102 and 103 in the bottom and top of chamber C prevent loss of particles through line 79.

When particles no longer flow through the line 101, the pump $P_2$ is stopped and the valves V81, 91, 97, 98, and 99 are closed.

The above-described cycle of operations can then be repeated.

The form of apparatus shown in FIG. 2 has the advantage over the apparatus of FIG. 1 that by using separate measuring and rinsing chambers A and C, the operation of measuring and isolating a predetermined batch of particles in chamber A can be carried out at any time after the preceding measured batch has been transferred to the column B and the chamber A has been drained down, without needing to wait until a batch of eluted and rinsed particles has been discharged from the apparatus. Thus the apparatus of FIG. 2 is capable of handling slurries of loaded particles at somewhat higher throughput rates.

EXAMPLE

The apparatus described above with reference to FIG. 1 was employed to strip ion exchange resin particles loaded with $U_3O_8$. The resin particles were IRA 400 strong base ion exchange resin particles of from 28 to 48 mesh (Tyler Standard Screen). The supply of loaded particles was provided from a fluid/solid contactor apparatus of the kind described in applicant's abovementioned U.S. patent application Ser. No. 399,515.

The measuring chamber A was 14 inches diameter by six feet high. The dimensions of the elution column B were 14 inches diameter by eighteen feet high.

The resin stripping procedure was carried out continually in the following cycle of operation, starting from where the chamber A was filled with pregnant (feed) liquor to the contactor apparatus, and the elution column B contained five batches of resin and liquid eluant with increasing concentrations of eluted $U_3O_8$ towards the bottom of the column.

The input of loaded resin to the chamber A was made with pregnant liquor at a flow rate of 6 U.S. gpm through the line 14. The resin in chamber A was then allowed to settle for one minute. Excess resin was removed through the pipe 19 in the manner described above to leave a measured batch of loaded resin in chamber A, and this operation occupied one minute.

Pregnant liquor was then drained from chamber A by blowing it down with air at 12 psig through line 22 for 4 mins. and the effluent was recovered through line 17 in the pregnant liquor feed reservoir of the contactor apparatus.

Chamber A was then filled in upflow through line 27 with strong eluate at a flow rate of 6 U.S. gpm until chamber A was full and all air was excluded.

A flow of 30 U.S. gpm of strong eluate was then introduced into the bottom of the elution column B for a period of about 5 secs. through line 10 to commence the upward lifting of the bed of resin in column B. At the end of this time, the resin from the measuring chamber A was transferred to the bottom of the column B through the line 10 by flowing 20 U.S. gpm of eluate into the top of chamber A through V28 and a flow of 10 U.S. gpm into the bottom of the chamber through V24. The resin transfer was completed in 70 secs.

A flow of 15 U.S. gpm of barren solution was then introduced into the top of column B through line 33 to push the plug of resin in column B down to the bottom of the column and to exclude through line 42 the strong eluate used to transfer the resin. At the same time, the chamber A was drained down to the strong eluate reservoir 26 through the strainer 16 and valve V43.

The top batch of resin in the column B was then rinsed with barren solution passing in through line 33 and out through line 66, and then the rinsed batch was transferred out of the top of column B and returned to the contactor apparatus through the line 68 by flushing it out with barren solution passed through the lines 33 and 44.

The liquid level in column B was then lowered to just above the level of resin remaining in the column B by draining down through line 66.

Fresh eluant was then introduced above the resin in column B through line 33 and a measured volume of the eluant was flowed downward through the resin at a flow rate of 1.9 U.S. ggpm for a period of 20 mins. The eluant employed was a nitrate solution of 1M concentration (calculated as $NO_3$) at pH2. An outflow of strong eluate through the strainer 41 to the eluate reservoir 26 with a concentration of 35 grams/liters $U_3O_8$ was obtained, when the loaded resin that was stripped initially contained 78 grams/liter $U_3O_8$.

Although the detailed Example above has referred to the recovery of valuable uranium ions from ion-exchange resins onto which the uranium is loaded, it will be appreciated that the method and apparatus of the invention can be used for stripping materials from resins and other loaded solid particles otained in other hydrometallurgical processes, as well as in other applications such as regeneration of exhausted resins used in water-softening and purification, recovery of materials absorbed on carbon or other particles used for example in sugar and fruit juice treatment, in the preparation of chemicals, in anti-pollution operations, treatment of leach liquors and mine waters effluents from tailing ponds, and in the tertiary treatment of sewage.

It will be understood that the form of the invention herewith shown and described is a preferred example, and that various modifications can be carried out without departing from the spirit of the invention or the scope of the appended claims.

What I claim as my invention is:

1. A method of stripping solid particles loaded with material to be eluted therefrom, wherein the loaded particles are supplied in the form of an input slurry in a carrier liquid, comprising the steps of establishing an upwardly-extending elution column containing a plurality of *uniform* batches of the particles *in the form of*

*discrete plugs arranged* in vertically adjacent layers; *maintaining said batches in the column in quiescent state, whereby the particles of each plug do not intermingle substantially with the particles of vertically adjacent plugs,* said elution column holding an eluant liquid which contains progressively higher concentrations of the eluted material toward the bottom thereof: intermittently flowing a stripping eluant liquid downwardly through said column and concurrently therewith discharging strong eluate from the bottom of the column, isolating [a batch] *successive uniform batches* of *the loaded resin particles from* the input slurry; separating the carrier liquid from [said] *each* isolated *uniform* batch: [slurrying said] *contacting each* isolated *uniform* batch *with a portion of the strong eluate withdrawn from the bottom of the column* after separation of the carrier liquid therefrom, *and thereafter slurrying each batch* into the bottom of the column with strong eluate, *whereby the isolated batches pass successively upwardly through the column in the form of discrete plugs of which the particles do not intermingle substantially with the particles of vertically-adjacent plugs*; and discharging a batch of particles from the uppermost level of the column.

2. A method as claimed in claim 1 wherein a batch of said loaded particles is slurried into the bottom of the column before the eluant liquid is flowed through the column.

3. A method as claimed in claim 1 wherein the eluant liquid is flowed through the column after a batch of particles has been discharged from the column, and the eluant liquid is flowed in a series stream passing through the discharged batch of particles and thereafter through the particles in the column.

4. A method as claimed in claim 3 including draining eluant liquid from the discharged batch of particles and thereafter rinsing the discharged particles with rinsing liquid.

5. A method as claimed in claim 1 wherein each batch of the particles is discharged as an output slurry from the upper level of the column by slurrying it therefrom with eluant liquid.

6. A method as claimed in claim 5 wherein said discharge of output slurry is induced by flowing eluant liquid in a closed circuit comprising the upper part of said column, a chamber structure, and strainer means disposed externally of the column, liquid withdrawn through the strainer means being re-circulated to the upper part of said column.

7. A method as claimed in claim 1 wherein each batch of particles is discharged from the column by flushing the uppermost layer of particles out of the column with liquid introduced through an inlet positioned on the side of the upper part of the column, whereby the quantity of particles flushed out is dependent on the extent to which the particles in the column have been lifted by entry of the loaded particles slurried into the bottom of the column.

8. A method as claimed in claim 1 wherein said batch of the input slurry is isolated as a measured batch by flowing an excess of the loaded particles into a chamber structure, allowing the particles to settle, and then flushing out excess particles through an outlet pipe having its mouth arranged at a predetermined point in the chamber structure until particles no longer flow out through the outlet pipe.

9. A method as claimed in claim 1 wherein said carrier liquid is separated from said isolated batch by displacing the carrier liquid with air.

10. A method as claimed in claim 9 wherein said isolated batch of particles is at least partially dried after the carrier liquid is separated therefrom and before said isolated batch is slurried into the column.

* * * * *